United States Patent [19]

Isono et al.

[11] 4,197,556
[45] Apr. 8, 1980

[54] HUE CORRECTION CIRCUIT

[75] Inventors: Katsuo Isono, Kawagoe; Seiji Sanada, Yokosuka, both of Japan

[73] Assignee: Sony Corporation, Tokyo, Japan

[21] Appl. No.: 894,513

[22] Filed: Apr. 7, 1978

[30] Foreign Application Priority Data

Apr. 8, 1977 [JP] Japan .................. 52-40633

[51] Int. Cl.$^2$ ........................................... H04N 9/535
[52] U.S. Cl. ....................................... 358/28; 358/35
[58] Field of Search .................................. 358/28, 35

[56] References Cited

U.S. PATENT DOCUMENTS

| | | | |
|---|---|---|---|
| 2,748,281 | 5/1956 | van de Polder | 331/20 |
| 3,755,617 | 8/1973 | Ichida | 358/28 |
| 3,821,792 | 6/1974 | Sugihara et al. | 358/35 |
| 4,044,375 | 8/1977 | Norman | 358/172 |
| 4,096,515 | 6/1978 | Brown et al. | 358/28 |

*Primary Examiner*—John C. Martin
*Attorney, Agent, or Firm*—Lewis H. Eslinger; Alvin Sinderbrand

[57] ABSTRACT

In a color video display device, such as a television receiver or a monitor associated with a color video tape recording and reproducing apparatus, and which is responsive to a composite color video signal including a luminance component and a chrominance component containing a chrominance signal, a burst signal and a chrominance reference portion of a vertical interval reference (VIR) signal; a hue-correction circuit is provided for dynamic correction of chrominance phase errors. The hue correction circuit includes a phase comparator that provides an output in response to the phase difference between the burst signal and the chrominance reference portion of the VIR signal, an oscillator for providing a continuous wave at the frequency of the burst signal, a controlled amplifier acting on the luminance component and having its gain controlled by the output of the phase comparator to provide a correction signal, and a phase modulator for adjusting the phase difference between the chrominance signal and the continuous wave signal in response to the correction signal. The phase comparator can include first and second sample-and-hold circuits for sampling the chrominance phase during the burst signal and during the chrominance reference portion of the VIR signal, respectively. The hue correction circuit can also include a clamp for clamping the output of the controlled amplifier to a reference level during the burst signal.

15 Claims, 18 Drawing Figures

HUE CORRECTION CIRCUIT

BACKGROUND OF THE INVENTION

1. Field of the Invention

This invention relates generally to color video display apparatus, such as color television receivers or monitors for color video recording and reproducing apparatus (VTR), and more particularly is directed to an improved hue correction circuit responsive to a vertical interval reference (VIR) signal included in the color video signal.

2. Description of the Prior Art

The chrominance signal in a broadcast composite color video signal is subject to phase shift or distortions in the course of transmission of the video signal. As a result of the foregoing phase shift or distortion, the color image presented to a viewer on a video display apparatus may have hue distortions, that is, the displayed images may vary in hue from the original picture.

Further, in a color video tape recorder or the like, in which a so-called "color-under" or "lower-frequency-converted recording method" is used to convert the chrominance signal to a lower frequency range for recording, the FM luminance signal operates as a biasing voltage for the converted chrominance component in the recorded composite signal. As a result of the biasing by the luminance component, upon reproduction and reconversion of the chrominance signal to the original frequency range, the chrominance signal is subject to phase distortion with changes in the luminance of the recorded signal. Thus, the reproduced video signal can produce a video display in which the image suffers from hue distortion.

It is known to include in a color television receiver a circuit for automatically adjusting the hue to correct for phase errors. The automatic hue adjustment employs a vertical interval reference (VIR) signal which is part of the transmitted or broadcast color video signal. The VIR signal is, in accordance with the accepted standard, generated as part of the television signal during the vertical blanking interval and more particularly usually during the nineteenth horizontal line interval of the vertical blanking interval). Although the VIR signal includes luminance and chrominance reference portions or components that would otherwise be visible, the VIR signal occurs when the electron beam or beams of the picture tube scan a region of the screen that is not visible so as to avoid interference with the picture being viewed.

The chrominance and luminance reference portions of the VIR signal have been selected to correspond in amplitude to values that would be present during transmission of a color video signal representing human skin tones. Thus, the chrominance reference portion of the VIR signal is superimposed on a luminance level of 70 IRE units, which level corresponds to the approximate brightness of average skin tones of a person of the white European or caucasian race. The relation of the VIR signal to skin tones has been selected because a viewer will be aware of approximately the proper hue of skin tones, although the viewer may have no way of knowing the proper hue of other objects in the television picture.

However, the VIR signal has been designed to correspond to the correct skin tone for persons of European (white) or Caucasian race.

Existing television receivers responsive to the VIR signal present an image in which skin tones of persons of the European (white) or Caucasian race have the correct hue, but the correct hue is not realized in respect to the skin tones of other races which have different levels. For example, skin tone levels for persons of the Asian (yellow) races may be between 40–60 IRE units, and for persons of the African (black) races may be perhaps only 20–40 IRE units. Existing hue correction circuits carry out hue-correction only at the so called average skin tone level of 70 IRE, and do not carry out hue correction over the entire range of brightness levels. Therefore prior art hue correction circuits do not present a video image with fully corrected skin tones for images of persons of non-European races.

OBJECTS AND SUMMARY OF THE INVENTION

It is an object of the present invention to provide a VIR-controlled hue correction circuit free of the above difficulties of existing hue correction circuits.

More specifically, it is an object of this invention to provide a VIR-controlled hue correction circuit which is effective to provide images with material-approving skin tones for persons of all races or colors.

It is another object of the invention to provide a VIR-controlled hue correction circuit in which hue correction is effected dynamically according to the luminance level of the input color video signal, thereby eliminating differential phase distortion for any level of brightness.

According to an aspect of this invention a hue correction circuit responsive to the burst signal and to the chrominance reference portion of the VIR signal includes a comparator that provides an output level in response to the phase difference between the input burst signal and the chrominance reference portion of the VIR signal. A gain-controlled amplifier provides a correction signal which varies with both the luminance component of the video signal and the output level of the comparator. The correction signal is applied to a phase modulator or shifter to adjust the phase either of a continuous wave signal supplied by a reference oscillator in response to the burst signal, or of the chrominance component of the composite video signal.

The hue correction circuit can include a clamping circuit interposed between the controlled amplifier and the phase modulator for clamping the output of the gain controlled amplifier to a reference level during the burst signal.

In one embodiment of the invention, sampling circuits sample the output levels of a phase detecting circuit during the burst signal and during the chrominance reference portion of the VIR signal, and the sampled levels are compared to provide an output to control the gain of the controlled amplifier which acts on the luminance component of the video signal.

Thus, a phase locked loop control circuit is provided to control the phase of the continuous wave signal, or the phase of the chrominance signal according to the phase difference between the burst and the VIR signals, and according to the luminance level of the input color video signal.

As a result, not only are differential phase distortions corrected at the luminance level for the white European or Caucasian skin tone, but also the differential phase distortions are dynamically corrected at the brightness levels for darker colored objects such as, the skin tones of so-called black or colored persons or orientals to provide the viewer with an acceptable picture throughout the luminance range.

DESCRIPTION OF THE PREFERRED EMBODIMENTS

Figure 1:
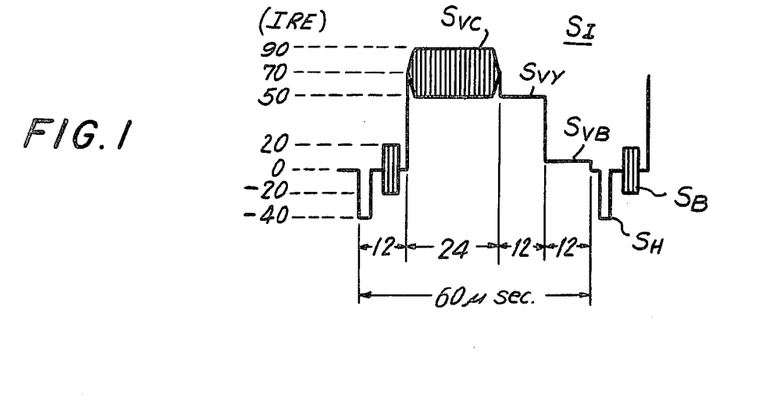
FIG. 1 is a waveform diagram showing a vertical interval reference (VIR) signal.

Referring to the drawings in detail, and initially to FIG. 1 thereof, it will be noted that the vertical interval reference (VIR) signal $S_I$ thus illustrated is intended to be used to control the hue correction circuit in a color video display apparatus. The VIR signal $S_I$ is an industry standard signal and is transmitted as part of a transmitted or broadcast color video signal. The VIR signal, in accordance with the accepted standard, is generated as part of the television signal during the vertical blanking interval, and more particularly, during the nineteenth horizontal line interval of the vertical blanking interval. The VIR signal is shown on FIG. 1, to include, in succession, a chrominance reference signal or portion $S_{VC}$ a luminance reference signal or portion $S_{VY}$, and a black level reference signal $S_{VB}$. The waveform of the standard VIR signal is based on amplitude proportions in which the pedestal level corresponds to zero IRE units, the peak white level corresponds to 100 IRE units, and the peak-to-peak amplitude of the burst signal $S_B$ corresponds to 40 IRE units.

The chrominance reference signal $S_{VC}$ is a sinusoidal waveform having the frequency of 3.58 MHz, as is the burst signal $S_B$. The chrominance reference signal $S_{VC}$ has the same amplitude and phase as the burst signal $S_B$.

The signal $S_{VC}$ is superimposed on a brightness level of 70 IRE units, which corresponds approximately to the average skin tones of a person of the European (White) or Caucasian race. The standardized level of the luminace reference signal $S_{VY}$, and of the black reference signal $S_{VB}$ are 50 IRE units and 7.5 IRE units respectively.

When a chrominance signal in the television picture is subjected to phase distortion, the chrominance reference signal $S_{VC}$ of the VIR signal $S_I$ will be subjected to similar phase distortion, and the resulting phase shift in the chrominance reference signal $S_{VC}$ relative to the burst signal $S_B$ corresponds to the phase distortion of the chrominance signal in the average human flesh tone range for persons of the European (white) or Caucasian race. If a circuit is provided in the television display apparatus for controlling the chrominance signal demodulation axis in accordance with the phase shift due to phase distortion, changes of hue due to phase distortion can be corrected in those signals corresponding to the average human skin tone brightness level.

However, the amount of differential phase shift in the chrominance signal depends upon the relative luminance signal on which it is superimposed. Thus, controlling the phase of the chrominance signal demodulation axis in accordance with the chrominance reference signal alone will not necessarily provide corresponding hue correction for chrominance signals superimposed on a luminance level different from the level (70 IRE units) for the average human skin tone. Skin tone luminance levels for persons of the Asian (Yellow) races may be between 40-60 IRE units, and for persons of the African (Black) races may be perhaps only 20-40 IRE units. Therefore, to provide acceptable hue correction for skin tone levels other than the so-called "average" human skin tone level which is applicable only to persons of the European (white) or Caucasian race, a dynamic hue correction is provided in accordance with the present invention for correcting the differential phase distortion in the chrominance signal of the broadcast video signal.

Figure 2:
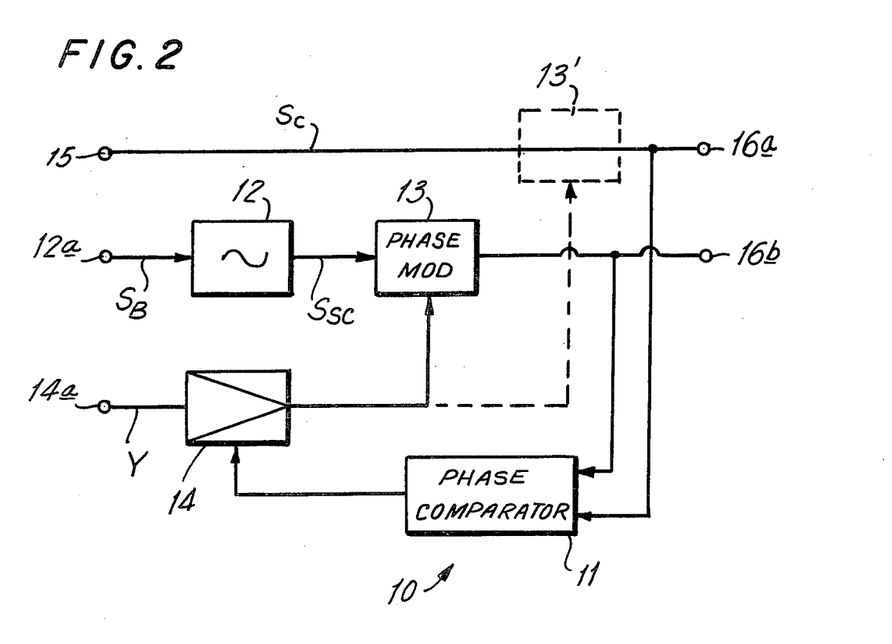
FIG. 2 is a block diagram showing the basic construction of a hue correction circuit according to the present invention.

With reference to FIG. 2, a basic hue correction circuit 10 according to this invention is shown to include a phase comparator 11 for comparing the phase of the chrominance reference signal $S_{VC}$ of the VIR signal $S_I$ with that of the burst signal $S_B$. The output of the phase comparator 11 is applied to a gain-controlled amplifier 14 as a control signal. The luminance component Y of the video signal is applied to an input 14a of amplifier 14. A reference oscillator 12 provides a continuous wave signal $S_{SC}$ having the same phase and frequency as the burst signal $S_B$ which is applied to an input 12a thereof. A phase modulator 13 is connected with oscillator 12 to control the phase of the continuous wave signal $S_{SC}$ in response to the output of amplifier 14. Continuous wave signal $S_{SC}$ is then provided at terminal 16b as a chrominance subcarrier for demodulating the chrominace signal $S_C$. In an alternative arrangement shown in broken lines on FIG. 2, a phase modulator 13' may be arranged to control the phase of the chrominance component of the video signal. In such a case, phase modulator 13' is connected in series between a chrominance input terminal 15 and to which chrominance signal $S_C$ is applied a chrominance output terminal 16a. In either case, phase modulator 13 or 13' will control the phase relationship between the output chrominance signal at terminal 16a and the chrominance subcarrier at terminal 16b.

Figure 3:
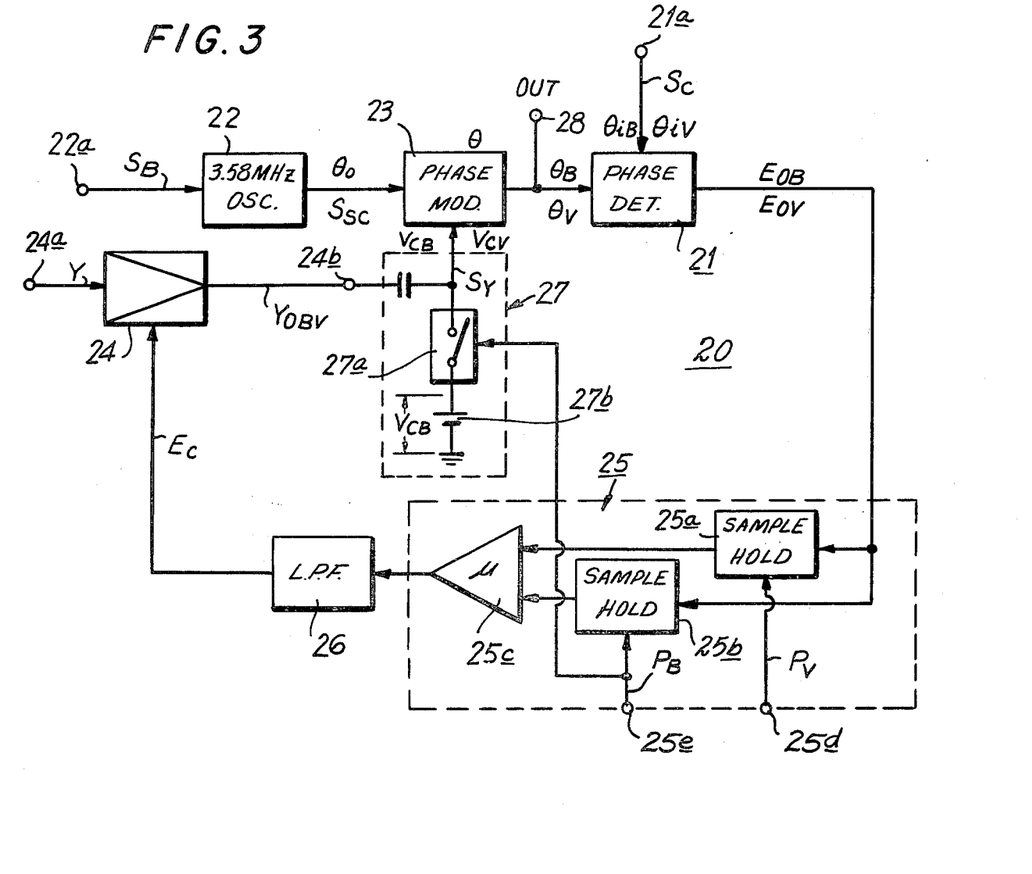
FIG. 3 is a system diagram used for explaining one embodiment of the hue correction circuit according to the present invention.

Referring now to FIG. 3, it will be seen that, in a specific embodiment of a hue correction circuit 20 according to the present invention, a phase detector 21 is connected to a chrominance input terminal 21a. A reference oscillator 22 provides a continuous wave signal $S_{SC}$ having the same phase and frequency (3.58 MHz) as the chrominance burst signal $S_B$ which is applied to an input 22a thereof. Continuous wave signal $S_{SC}$ is applied to a phase modulator 23 and thence to an output terminal 28 and to phase detector 21. Phase detector 21 provides an output signal $E_{OB}$ or $E_{OV}$ to a differential phase detection circuit 25, which includes first and second sample and hold circuits 25a and 25b and a comparator circuit 25c. First and second sample and hold circuits 25a and 25b are respectively controlled by a sampling pulse $P_v$ occurring during the chrominance reference portion of the VIR signal $S_I$, and by a clamping pulse $P_B$ occurring during the burst signal $S_B$. The sampling pulse $P_v$ and the clamping pulse $P_B$ are respectively applied to terminals 25d and 25e, and the outputs of circuits 25a and 25b are applied to respective inputs of comparator circuit 25c.

Figure 4A:
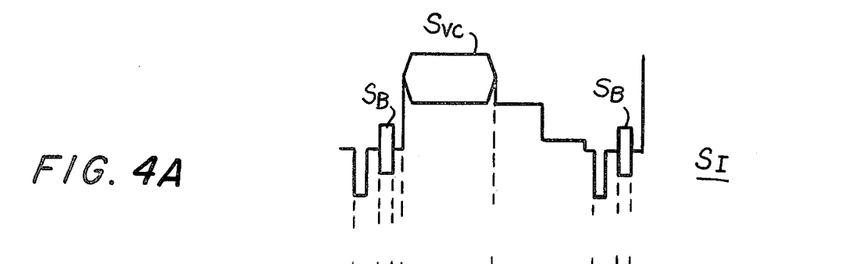
FIG. 4A-4G are waveform diagrams to which reference will be made in explaining the operation of the circuit of FIG. 3.
Figure 4B:
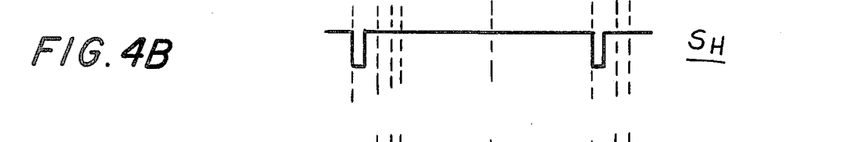
Figure 4C:
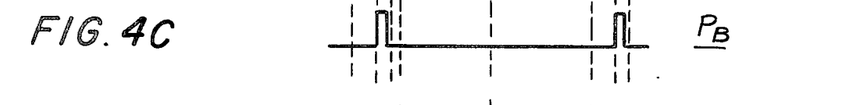
Figure 4D:
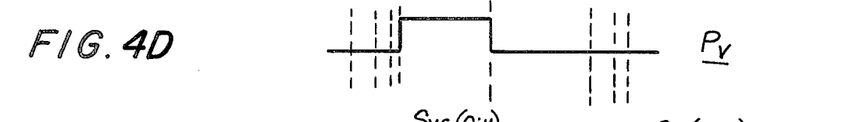
Figure 4E:
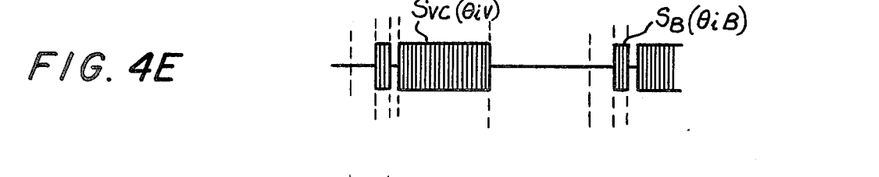
Figure 4F:
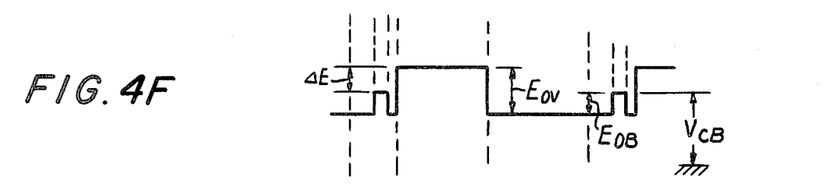

The output of comparator 25c is smoothed by a low pass filter 26 and then supplied as a control signal to a gain-controlled amplifier 24. A luminance signal Y derived from the incoming video signal is applied to input terminal 24a of gain-controlled amplifier 24 and the output $Y_{OBV}$ of the latter is supplied from output terminal 24b as a correction signal to phase modulator 23. A clamping circuit 27, including a normally open switching circuit 27a and a source 27b for supplying a reference potential $V_{CB}$, is interposed between gain-controlled amplifier 24 and phase modulator 23. Terminal 25e of the differential phase detection circuit 25 is also connected to the normally-open switching circuit 27a so that the latter is closed in response to clamping pulse $P_B$. Thus, clamping circuit 27 clamps the output of gain-controlled amplifier 24 to reference potential $V_{CB}$ during each burst signal period. As shown in FIGS. 4C and 4D, clamping pulse $P_B$ and sampling pulse $P_v$ are respectively provided during the period of each burst signal $S_B$ and during chrominance reference portion $S_{VC}$ of the VIR signal. As shown in FIGS. 4E and 4F, if the phase of burst signal $S_B$ in the chrominance signal $S_c$ supplied to terminal 21a is $\theta_{iB}$, the phase of the chrominance reference portion $S_{VC}$ in the chrominance signal $S_C$ is $\theta_{iV}$, the phase of the continuous wave signal $S_{SC}$ during the interval of the burst signal $S_B$ is $\theta_B$, the phase of the continuous reference wave signal $S_{SC}$ during the interval of chrominance reference portion $S_{VC}$ is $\theta_V$, and the gain factor of phase detector 21 is expressed as a constant, $K_d$ (calculated in volts/radian), then the output $E_{OB}$ of phase detector 21 measured during the burst signal period, and the output $E_{OV}$ of phase detector 21 measured during the chrominance reference portion of the VIR signal, can be expressed according to the following approximate equations:

$$E_{OB} \approx K_d(\theta_{iB} - \theta_B) \quad (1)$$

$$E_{OV} \approx K_d(\theta_{iV} - \theta_V) \quad (2)$$

The phase compared outputs $E_{OB}$ and $E_{OV}$ (FIG. 4F) are separately sampled in sampling circuits 25b and 25a, respectively, and are then supplied to comparator 25c which has a gain of $\mu$. The compared and amplified output of the comparator 25c is smoothed by low pass filter 26 which has a transfer function F (S), where S is a Laplace operator. Accordingly, the level of the smoothed output $E_C$ from filter 26 serves as a gain control signal for the amplifier 24 amplifying luminance signal Y. The output signal $E_C$ from filter 26 can be expressed according to the following equation:

$$E_c = \mu F(S)(E_{OV} - E_{OB}) \quad (3)$$

Figure 4G:
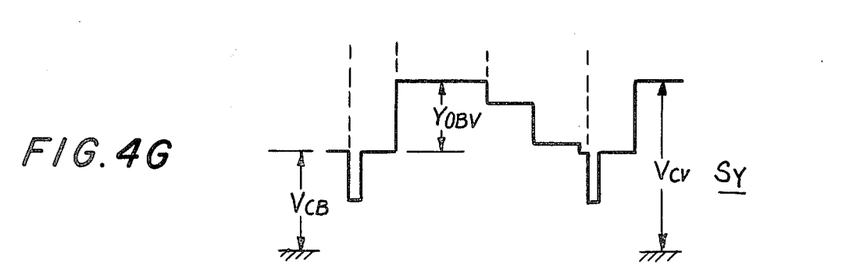

In equation (3), the term $(E_{OV} - E_{OB})$ represents the phase difference $\Delta\theta_i$ between the burst signal $S_B$ and the chrominance reference signal $S_{VC}$ in the input chrominance signal $S_C$. The luminance signal Y is amplified by the gain-controlled amplifier 24 and the resulting output of the latter is supplied to the phase modulator 23 as a phase control signal $S_Y$ (FIG. 4G). If the difference in level between the pedestal level (zero IRE units) on which the burst signal $S_B$ is superimposed, and the average human flesh tone level (70 IRE units) on which the VIR chrominance reference signal $S_{VC}$ is superimposed, is represented as $Y_{iBV}$, and the gain of the gain-controlled amplifier 24 is represented as $G = mE_C$, an amplified output level change $Y_{OBV}$ of gain control amplifier 24 relative to the input level change $Y_{iBV}$ can be expressed according to the following equation:

$$Y_{OBV} = m\, Y_{iBV} E_C \quad (4)$$

While the control voltage $E_C$ can be positive, zero or negative, depending on the phase distortion in chrominance signal $S_C$, for the sake of simplicity of explanation, the following description assumes that the control voltage $E_C$ is positive, and that the amplified output level change $Y_{OBV}$ is given positive amplification.

During the periods of each burst signal $S_B$, the clamping pulse $P_B$ causes switching circuit 27a to close. The phase control signal $S_Y$ provided by gain-controlled amplifier 24 is clamped at its pedestal level, and reference voltage $V_{CB}$ is supplied to phase modulator 23. The control signal level $V_C$ supplied to phase modulator 23 during the chrominance reference portion of the VIR signal is represented as $V_{CV}$ (FIG. 4G), and can be expressed by the following equation:

$$V_{CV} = V_{CB} + Y_{OBV} \quad (5)$$

During periods other than the burst signal interval or the chrominance reference portion of the VIR signal, the luminance signal Y is still amplified by the gain-controlled amplifier 24 and the amplified luminance signal is applied to the phase modulator 23. Thus, phase modulation of the continuance wave signal $S_{SC}$ is achieved so that the amount of phase shifting is substantially proportional to the level of the luminance signal. Therefore, whenever the luminance signal Y is at the zero IRE level, the control voltage $V_C$ applied to phase modulator 23 will be equal to the burst period level $V_{CB}$, and when the luminance signal Y is at the 70 IRE level, the control voltage $V_c$ for controlling the phase modulator 23 will equal the voltage $V_{CB}$ during the chrominance reference portion of the VIR signal. Moreover, when the level of the luminance signal Y is at a level between zero and 70 IRE units, control voltage $V_C$ takes on an appropriate value between $V_{CB}$ and $V_{CV}$.

If the phase shift $\theta$ caused by the phase modulator 23 can be expressed as $\theta = KV_c$, where K is a constant such that $K = \partial\theta/\partial V_C$, the phase shifts $\theta_B$ and $\theta_V$ during the burst signal $S_B$ and during the chrominance reference portion $S_{vc}$ of the VIR signal, respectively, can be expressed by the following equations:

$$\theta_B = KV_{CB} \tag{6}$$

$$\theta_v = KV_{CV} = K(V_{CB} + Y_{OBV}) \tag{7}$$

Here it is assumed for simplicity's sake, that the initial phase of the continuous wave signal is zero. As a result, the output phase of phase modulator 23 will equal the phase shift $\theta_0$ during the burst signal $S_B$ and the phase shift $\theta_v$ during the chrominance reference portion of the VIR signal.

Each of the control voltages $V_{CB}$ and $V_{CV}$ is equal to the output of amplifier 24 as controlled by level $E_c$ in accordance with the detected outputs obtained by phase detector 21. Because the amount of phase shift $\theta$ and hence the output phase of phase modulator 23 is controlled by the control voltages $V_{CB}$ and $V_{CV}$, it follows that the output phase $\theta$ is controlled to coincide with the input phase $\theta_{iB}$ and $\theta_{iV}$ of the chrominance signal $S_c$ during the burst signal and the chrominance reference portion of the VIR signal, respectively. Thus, any phase distortion occuring in the chrominance signal $S_c$ will produce a phase difference in the output of phase modulator 23 during the periods of the burst signal $S_B$ and the chrominance reference portion $S_{VC}$ corresponding to the phase difference between the signals $S_B$ and $S_{VC}$. Therefore, if the continuous wave signal $S_{SC}$ is applied to a colar demodulator as the chrominance subcarrier wave signal, the color demodulator will provide a demodulated output free from the differential phase distortion for luminance levels at the zero IRE and 70 IRE levels. The phase shifts, and hence the output phases $\theta_B$ and $\theta_V$ of equations (6) and (7), are provided from phase modulator 23 during intervals in which the level of the luminance signal Y becomes zero or 70 IRE units, respectively. However, during intervals in which the luminance level is between zero and 70 IRE units, or during an interval in which the luminance exceeds 70 IRE units, the phase modulator 23 provides an output phase $\theta$ between $\theta_B$ and $\theta_V$, or greater than $\theta_V$. The hue correction circuit 20 as shown on FIG. 2 is, in effect, a closed-loop control circuit. The phase of the chrominance signal superimposed on levels of Zero IRE units and 70 IRE units is corrected by the burst signal $S_B$ and the chrominance reference portion $S_{VC}$ inserted on the Zero and 70 IRE levels, respectively, while the phase of any chrominance signal superimposed on a luminance level other than the zero and 70 IRE levels is corrected in an amount proportional to the actual luminance level Y. Thus, the output phase $\theta$ of phase modulator 23 is modulated or shifted according to the level of luminance signal Y, and takes on an appropriate value depending on the luminance signal.

Figure 5:
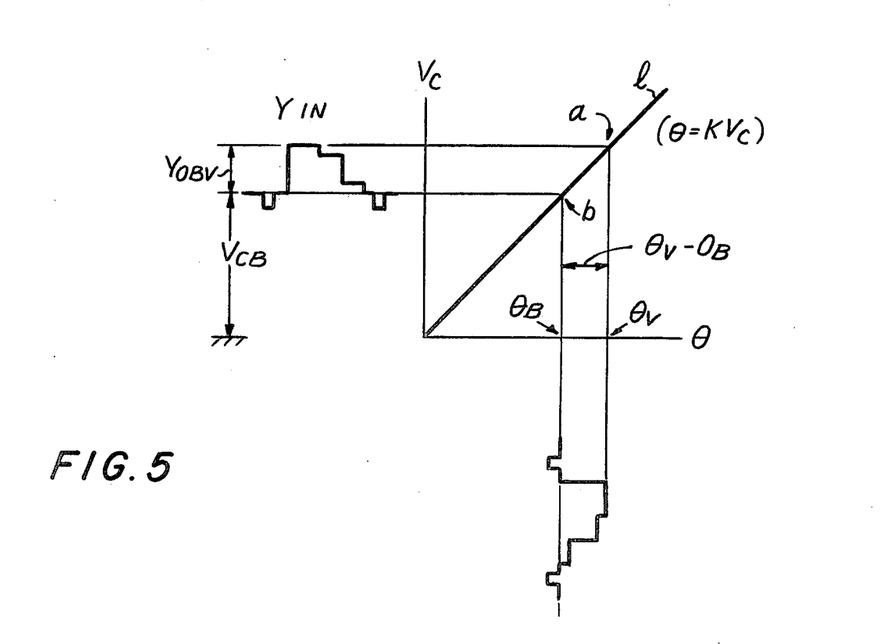
FIG. 5 is a graph illustrating operating characteristics of the hue correction circuit of FIG. 3.

In the graph of FIG. 5, the abscissa represents the phase shift $\theta$ effected by phase modulator 23. Because the phase of the continuous wave signal $S_{SC}$ from oscillator 22 is assumed to be zero, the abscissa on FIG. 5 also corresponds to the output phase of phase modulator 23. The ordinate on FIG. 5 represents the control voltage of phase control signal $S_Y$ which is applied to phase modulator 23. Phase modulator 23 is shown on FIG. 5 to exhibit a linear modulation characteristic represented by line 1, and the output phase $\theta$ of modulator 23 can be expressed $\theta = KV_c$ where K is a constant. Accordingly, if a control voltage $V_C$ is applied to phase modulator 23 as illustrated, the output phase becomes $\theta_B$ at a control point b along line 1 corresponding to the pedestal level, and the output phase becomes $\theta_V$ at a control point a corresponding to a level higher by $Y_{OBV}$ than the pedestal level. Between the control points a and b along line 1, the output phase is varied linearly between $\theta_B$ and $\theta_V$. While FIG. 5 shows only one horizontal interval occurring during the VIR signal, it is to be understood that the control signal $E_C$ provided in accordance with the applied luminance level Y will be provided during all of the signal and blanking intervals of each of the horizontal lines of the incoming video signal.

By utilizing the above equations (1)-(7), the operation of a hue correction circuit 20 can be analyzed to reveal final or stable condition thereof.

Initially, the difference $\Delta E_o$ between the controlled levels $E_{OV}$ and $E_{OB}$ supplied to gain controlled amplifier 24 during the burst signal $S_B$ and during the chrominance reference portion $S_{VC}$ of the VIR signal, respectively, can be expressed by the following equation:

$$\Delta E_o = E_{OV} - E_{OB} = \frac{K_d}{1 + K \cdot K_d \cdot \mu \cdot m \cdot Y_{iBV} \cdot F^{(s)}} (\theta_{iV} - \theta_{iB}) \tag{8}$$

In the final or stable condition, the expression $K \cdot K_d \cdot \mu \cdot M \cdot Y_{iBV} F(0)$ can be assumed to be much greater than unity. Thus, in the final or stable condition, equation (8) becomes:

$$\Delta E_o = \frac{1}{K \cdot \mu \cdot m \cdot Y_{iBV} \cdot F(O)} (\theta_{iV} - \theta_{iB}) \tag{9}$$

As herein expressed, the term $\theta_{iV} - \theta_{iB} = \Delta\theta_i$, represents the phase difference between burst signal $S_B$ and the chrominance reference portion $S_{VC}$ of the VIR signal $S_I$, occuring in the input chrominance signal $S_C$. This phase difference $\Delta\theta_i$ represents a differential phase distortion, and, as is apparent in equation (9), the phase difference $\Delta\theta_i$ is suppressed or reduced to a fraction $[1/K\mu mY_{iBV}F(0)]$ thereof, as measured at the output 28. It will be appreciated that, by increasing the loop gain of circuit 20, the difference level $\theta E_0$ becomes extremely small, with the result that the differential phase distortion between the burst signal $S_B$ and the chrominance reference portion $S_{VC}$ of the VIR signal $S_I$ is very closely corrected. The control voltage $E_c$ supplied from filter 26 to amplifier 24 in stable or final condition can be expressed by the following equation:

$$E_c = 1/(m \cdot K \cdot Y_{iBV}) \Delta\theta_i \tag{10}$$

Accordingly, the output $Y_{OBV}$ of amplifier 24 provided in response to control voltage $E_c$ can be expressed in accordance with the following equation:

$$Y_{OBV} = (1/K) \Delta\theta_i \tag{11}$$

As a result, the control voltage $V_{CV}$ applied to phase modulator 23 during the VIR signal $S_I$ is expressed by the following equation:

$$V_{CV} = V_{CB} + (1/K) \Delta\theta_i \tag{12}$$

Figure 6:
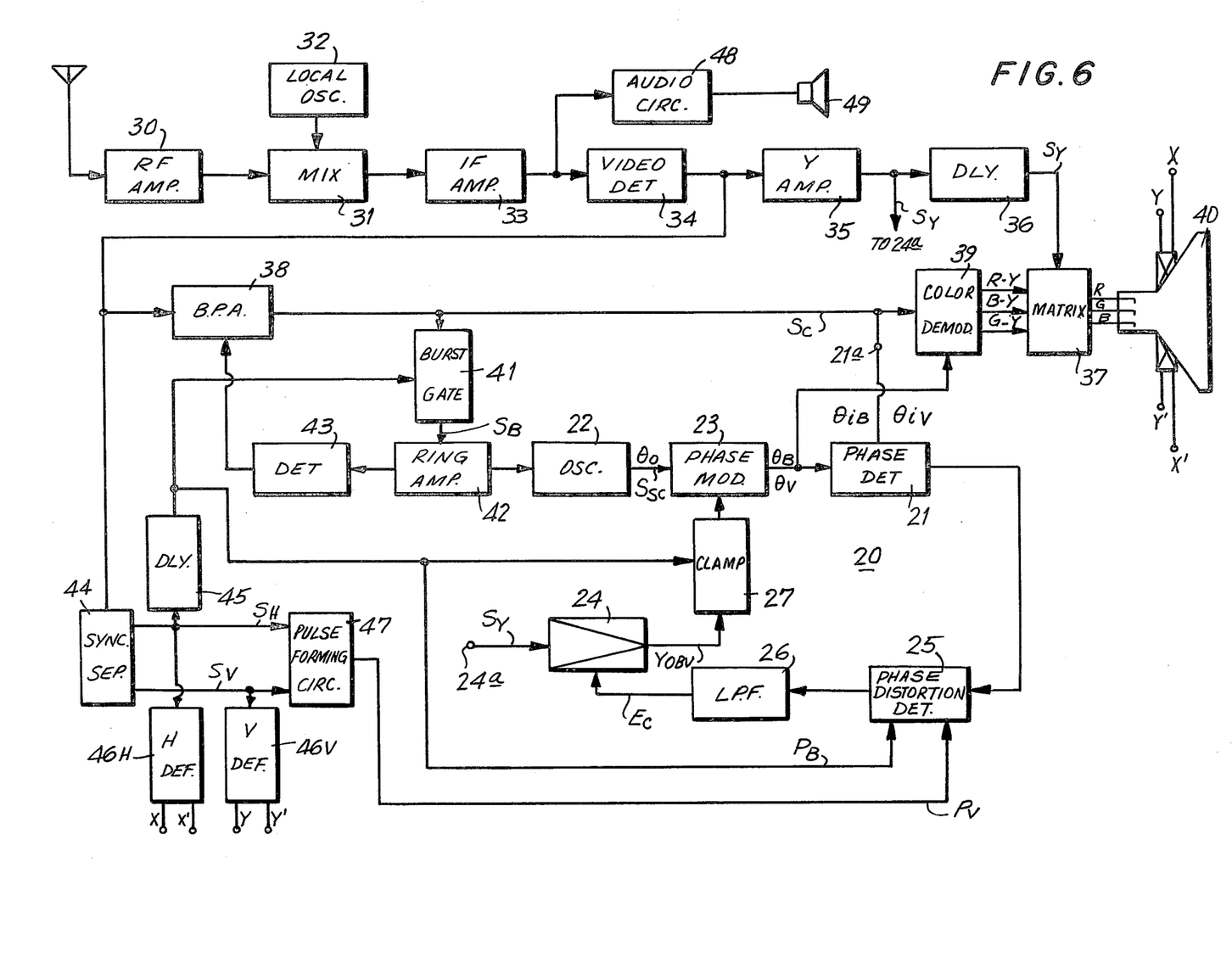
FIG. 6 is a system diagram showing one example of a color television receiver incorporating the hue correction circuit of FIG. 3.

The amplified output $Y_{OBV}$ can take on a positive, zero, or negative value, depending upon the value of the phase difference $\Delta\theta_i$ between the burst signal $S_B$ and the chrominance reference portion $S_{VC}$. Therefore, it is required that the amplifying characteristic of the amplifier 24 be such that the polarity of its output will be varied according to the control voltage. Controlled amplifiers having such a characteristic are well known in the art. Referring now to FIG. 6, hue correction circuit 20 of FIG. 3 is thus shown applied to a practical television receiver for controlling the phase of the chrominance subcarrier.

In the television receiver shown on FIG. 6, a received signal is applied through an RF amplifier 30 to a mixer 31 which also receives an oscillation from a local oscillator 32 to provide an IF signal through an IF amplifier 33 to a video detector 34 which detects a color video signal including a VIR signal $S_I$. The luminance component $S_Y$ of the detected color video signal is applied through a luminance amplifier 35 and a delay circuit 36 to a matrix circuit 37.

The detected output of video detector 34 is also applied to a band-pass amplifier 38 which separates therefrom the chrominance signal or component $S_C$ which is, in turn, supplied to a color demodulator 39 for demodulating color signals. In this example, color demodulator 39 provides color difference signals R-Y, B-Y, and G-Y, which, when applied, together with a luminance signal Y, to matrix circuit 37, permit the latter to provide respective primary color signals R, G, and B, which are then supplied to a color cathode ray tube 40.

Chrominance signal $S_C$ is also applied to a burst gate circuit 41 for extracting the burst signal $S_B$ therefrom. The extracted burst signal $S_B$ is supplied through a ringing amplifier 42 to the oscillator 22 for providing the continuance wave signal $S_{SC}$. In this example, a chrominance signal level detector 43 is provided to sense the level of the chrominance signal in the ringing amplifier 42. The output of level detector 43 is applied to band-pass amplifier 38 as an automatic color control signal.

The video signal is also supplied from video detector 34 to a synchronizing signal separator 44 which separates the horizontal synchronizing signal $S_H$ and vertical synchronizing signal $S_V$ from the input video signal. The horizontal synchronizing signal $S_H$ is applied through a delay circuit 45 to the burst gate circuit 41 as a gating signal therefor, and is also applied from delay circuit 45 to clamping circuit 27 as a clamping pulse $P_B$. The horizontal and vertical synchronizing signals $S_H$ and $S_V$ obtained from the synchronizing signal separator circuit 44 are respectively applied to horizontal and vertical deflection systems 46H and 46V.

The horizontal and vertical synchronizing signals $S_H$ and $S_V$ are also applied to a pulse forming circuit 47 which forms the sampling pulse $P_V$ (FIG. 4D) in the interval of chrominance reference portion $S_{VC}$ of the VIR signal (FIG. 4A), that is, during the 19th horizontal line interval of the vertical blanking interval. For forming the sampling pulse $P_v$, the horizontal synchronizing signal $S_H$ is counted during the period beginning with the vertical synchronizing signal $S_v$, to detect the interval in which the VIR signal $S_I$ occurs. The pulse forming circuit 47 can include a monostable multivibrator or the like for forming the pulse $P_v$ on the basis of the counted synchronizing signal $S_H$.

The output $S_Y$ of luminance amplifier 35 is applied to the input terminal 24a of the gain-controlled amplifier 24, which receives the output of phase distortion detector 25 smoothed by low pass filter 26 as a control level $E_C$. The output of amplifier 24 is then applied to phase modulator 23 by way of clamp circuit 27. The output of phase modulator 23 is then supplied to phase detector 21 and also to color demodulator 39 as a chrominance subcarrier signal. The television receiver of FIG. 6 is shown to be completed by a circuit 48 for processing audio signals and a speaker 49.

Figure 7:
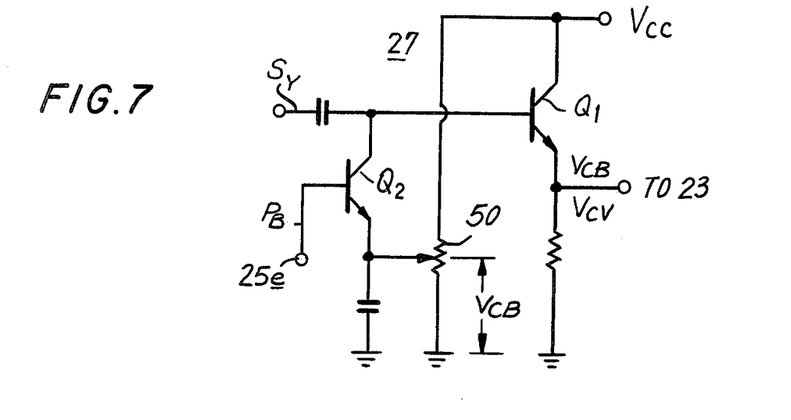
FIG. 7 is a circuit diagram showing a clamping circuit for use in the hue correction circuit of FIG. 6.

As shown on FIG. 7, the clamping circuit 27 may comprise an emitter-follower transistor $Q_1$ and a switching transistor $Q_2$. The output luminance signal from gain-controlled amplifier 24 is applied to the base of emitter-follower transistor $Q_1$ and to the collector of switching transistor $Q_2$. A variable resistor 50 is connected between the collector of transistor $Q_1$ and ground, and the emitter of switching transistor $Q_2$ is connected to a movable contact of variable resistor 50 for selecting a reference voltage to be applied as the output voltage of switching transistor $Q_2$. The base of transistor $Q_2$ is connected to input terminal 25e which receives the clamping pulse $P_B$. Accordingly, when a clamping pulse $P_B$ is applied to transistor $Q_2$ during the burst signal $S_B$, transistor $Q_2$ is turned ON, and the collector voltage of transistor $Q_2$ is clamped to reference voltage $V_{CB}$ during the burst signal interval. Thus, transistor $Q_1$, which acts as a buffer transistor, provides at its emitter a signal at a level equal to the reference voltage $V_{CB}$ during the burst signal interval. During periods other than the burst signal interval, transistor $Q_1$ provides an output level corresponding to the amplified luminance signal Y from the output of gain-controlled amplifier 24.

Figure 8:
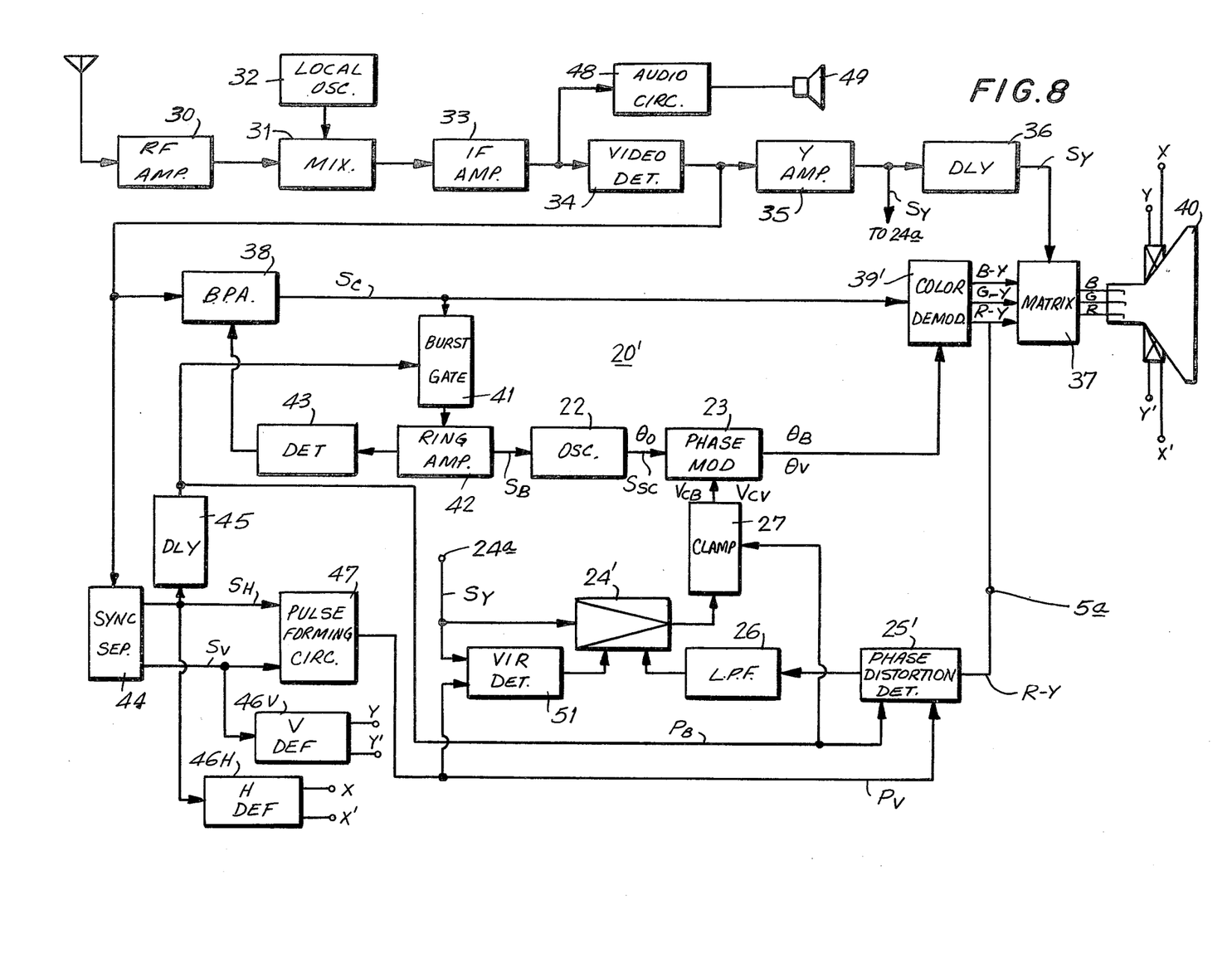
FIG. 8 is a system diagram showing another example of a color television receiver incorporating a hue correction circuit according to the present invention.

Referring now to FIG. 8, it will be seen that, in another embodiment of a hue correction circuit 20' according to the present invention, the color demodulator 39' is used both for demodulating the input chrominance signal $S_c$ and for detecting phase errors in the chrominance signal, in lieu of phase detector 21 of FIG. 6. Those elements in the embodiment of FIG. 8 which correspond to elements described with reference to FIG. 6 are identified by the same reference numerals and are not described again.

In the television receiver shown in FIG. 8, a VIR signal detecting circuit 51 is provided for detecting the intensity of the VIR signal $S_I$ in the color video signal for inhibiting the operation of the hue correction circuit 20° whenever a VIR signal $S_I$ is absent or is so weak that noise superimposed on the VIR signal would preclude effective operation of the hue correction circuit 20'. More particularly, when VIR signal detecting circuit 51 determines that the VIR signal $S_I$ is absent or is too weak, it supplies gain-controlled amplifier 24' with a control signal to inhibit operation of the latter.

Figure 9:
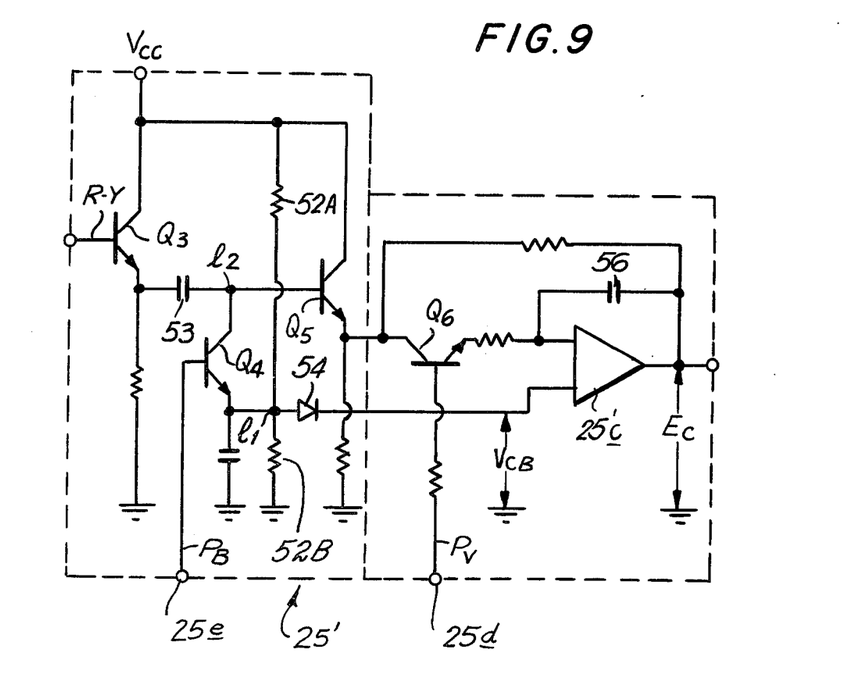
FIG. 9 is a circuit diagram showing an example of a clamping circuit and a comparator circuit suitable for use as a detecting circuit in the hue correction circuit of FIG. 8.

As shown in greater detail on FIG. 9, in the phase distortion detecting circuit 25' of FIG. 8, one of the color difference outputs, for example, output R-Y, from color demodulator 39' is applied to the base of a buffer transistor $Q_3$ as a phase difference signal. A pair of voltage divider resistors 52A and 52B are arranged in series between the collector of buffer transistor $Q_3$ and ground, and define a reference point $l_1$ therebetween. A second buffer transistor $Q_5$ has its collector connected to the collector of buffer transistor $Q_3$ and its base connected through a clamping capacitor 53 to the emitter of buffer transistor $Q_3$. A sampling transistor $Q_4$ has its collector connected at a point $l_2$ between the base of buffer transistor $Q_5$ and one side of capacitor 53, and the emitter of transistor $Q_5$ and one side of capacitor 53, and the emitter of transistor $Q_4$ is connected to point $l_1$. The base of transistor $Q_4$ is connected to clamping pulse input terminal to receive pulse $P_B$ from delay circuit 45. The demodulated output R-Y is applied through buffer transistor $Q_3$ to one side of clamping capacitor 53.

When a clamping pulse $P_B$ is supplied to the base of clamping transistor $Q_4$, the potential at point $l_2$ between clamping capacitor 53 and the base of buffer transistor $Q_5$ is clamped to a reference voltage determined by resistors 52A and 52B. The reference voltage at point $l_1$ is applied through a voltage compensation diode 54 to a positive (+) terminal of the comparator 25'c as its reference voltage $V_{CB}$. At the same time, the clamped level at the collector of clamping transistor $Q_4$ is applied through buffer transistor $Q_5$ to the minus (−) terminal of comparator 25'c. In this embodiment, the sampling circuit comprises a sampling transistor $Q_6$ and a holding capacitor 56. The base of sampling transistor $Q_6$ is connected to sampling pulse input 25d to receive the sampling pulse $P_V$ from circuit 47. After the DC level of the color difference R-Y is clamped to reference voltage $V_{CB}$ during the burst signal, sampling pulse $P_V$ immediately succeeding the clamping pulse $P_B$ is applied so that comparator 25'c can compare the level of the color difference signal R-Y during the chrominance reference portion $S_{VC}$ of the VIR signal with the reference voltage $V_{CB}$. The resulting compared output is held in capacitor 56. Thus, the output $E_c$ from comparator 25'c in this example corresponds to the output $E_c$ from comparator 25c of FIG. 3.

Figure 10:
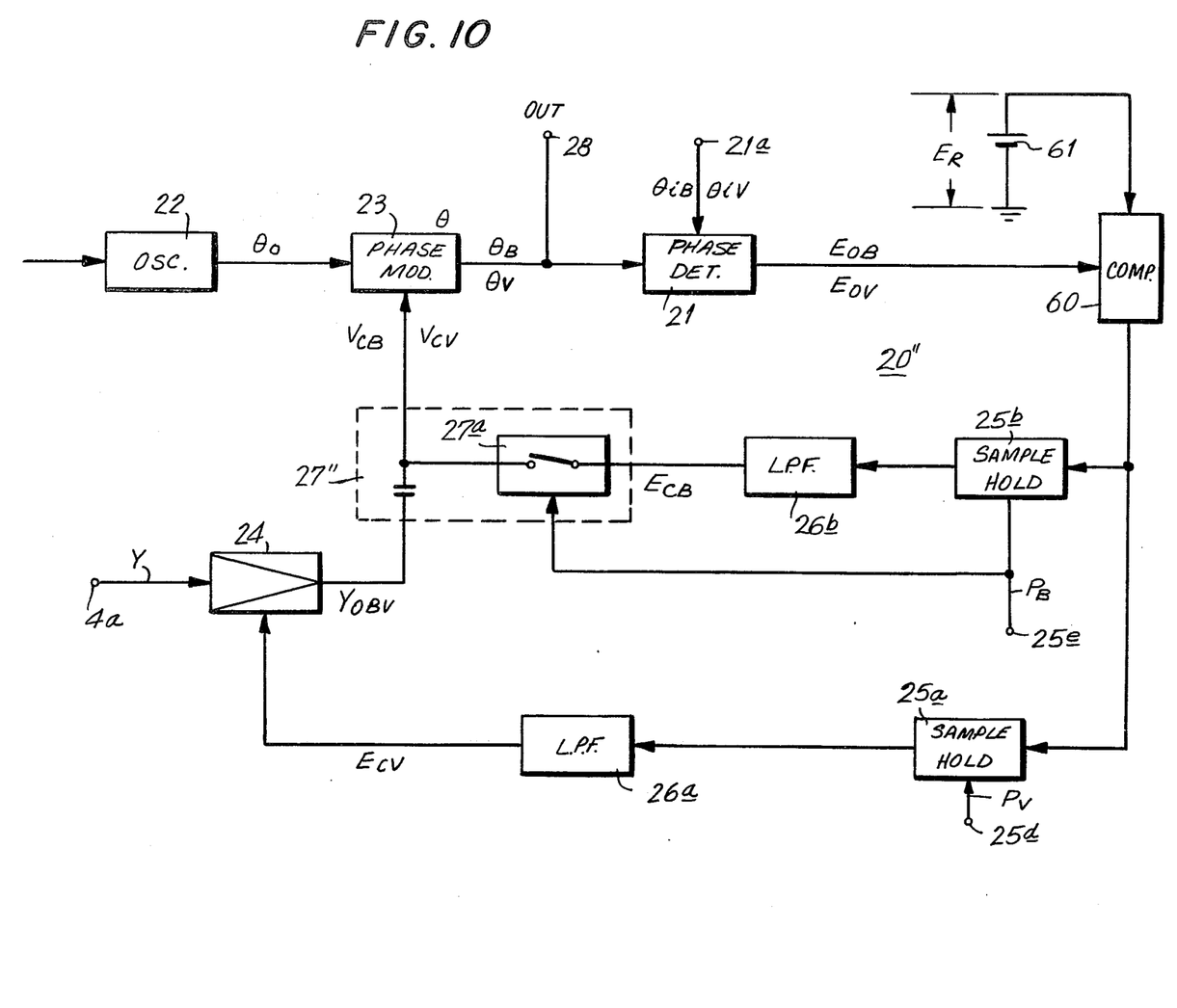
FIG. 10 is a system diagram of still another embodiment of the hue correction circuit according to the present invention.

With reference to FIG. 10, it will be seen that another embodiment of a hue correction circuit 20'' according to the present invention can include separate voltage detecting loops and reference voltage loops. More particularly, in the embodiment of FIG. 10, phase detector 21 provides output levels $E_{OB}$, $E_{OV}$ to a voltage comparator 60 during the burst signal period and the chrominance reference portion of the VIR signal respectively. Voltage comparator 60 compares outputs $E_{OB}$, $E_{OV}$ with a reference voltage $E_R$ from a reference voltage source 61. The compared outputs from the comparator 60 are supplied to sampling circuits 25b and 25a, during the burst signal period and the VIR signal, respectively. During the burst signal $S_B$, clamping pulse $P_B$ is applied to sampling circuit 25b and to switch 27a in a clamping circuit 27''. The compared voltage from comparator 60 is sampled by sampling circuit 25b and the resulting sampling level is supplied through a low-pass filter 26b to clamping circuit 27''. Switch 27a clamps the output of the controlled amplifier 24 to the pedestal level during the burst signal $S_B$. During the chrominance reference portion $S_{VC}$ of the VIR signal $S_I$, the output of comparator 60 is sampled by sampling circuit 25a. The sampled level is smoothed by a low-pass filter 26a and supplied as control signal $E_{CV}$ to gain-controlled amplifier 24. In the embodiment of FIG. 10, the voltage for clamping the pedestal level of the luminance signal during the interval of a burst signal $S_B$ is provided as a closed-loop controlled voltage.

The operation of the hue correction circuit 20'' of FIG. 10 can be explained by an analysis similar to that used in respect to FIG. 3. If the symbols and reference characters used in connection with the hue correction circuit 20 of FIG. 3 are used in connection with this example, outputs $E_{OB}$ and $E_{OV}$ of phase detector 21 can be expressed by the following equations:

$$E_{OB} \approx K_d(\theta_{iB} - \theta_B) \quad (13)$$

$$E_{OV} \approx K_d(\theta_{iV} - \theta_V) \quad (14)$$

The above outputs $E_{OB}$ and $E_{OV}$ are supplied to comparator 60 for comparison in the latter with reference voltage $E_R$.

During the burst signal $S_B$ and the chrominance reference portion $S_{VC}$ of the VIR signal, the output of voltage comparator 60 is applied to the respective sampling circuits 25b and 25a where the output is sampled and held. The outputs of sampling circuits 25b, 25a are applied through low-pass filters 26b and 26a to provide therefrom control voltages $E_{CB}$ and $E_{CV}$, respectively. The gains $\mu_B$, $\mu_V$ of sampling circuits 25b, 25a, respectively, and transfer functions $F_B(S)$ and $F_V(S)$ of low-pass filters 26b, 26a, respectively, can be expressed by the following relationships:

$$E_{CB} = \mu_B F_B(S)(E_{OB} - E_R) \quad (15)$$

$$E_{CV} = \mu_V F_V(S)(E_{OV} - E_R) \quad (16)$$

The control characteristic G of gain-controlled amplifier 24 can be expressed by the following equation:

$$G = mE_{CV}, \ (m = \partial G/\partial E_{CV}) \quad (17)$$

and the following relationship results:

$$Y_{OBV} = mE_{CV}Y_{iBV} \quad (18)$$

As described above with respect to FIG. 3, the control voltages $V_{CB}$ and $V_{CV}$ can be expressed:

$$V_{CB} = E_{CB} \quad (19)$$

and $$V_{CV} = V_{CB} + Y_{OBV} \quad (20)$$

The modulation characteristic of the phase modulator 23 is also expressed as described above in connection with FIG. 3:

$$\theta = KV_C, \ (K = \partial \theta/\partial V_C) \quad (21)$$

and the phase shift $\theta_B$ and $\theta_V$ during the burst signal interval and the portion $S_{VC}$ of the VIR signal, respectively, are expressed by the following equations:

$$\theta_B = KV_{CB} \quad (22)$$

$$\theta_V = KV_{CV} \quad (23)$$

Again, as with the hue correction circuit 20 of FIG. 3, the initial output phase of oscillator 22 is assumed to be zero for simplicity of explanation. Therefore, the phase shifts $\theta_B$ and $\theta_V$ are equal to the output phases of the phase modulator 23 during the burst signal interval and portion $S_{VC}$ of the VIR signal, respectively. The output phase $\theta_B$ during the burst signal interval is calculated from equations (13), (15), (17), (22), and can be expressed as follows:

$$\theta_B = \frac{KK_d\mu_B F_B(S)}{1 + KK_d\mu_B F_B(S)} \theta_{iB} - \frac{K\mu_B F_B(S)}{1 + KK_d\mu_B F_B(S)} E_R \quad (24)$$

However, since $KK_d\mu_B F_B(0)$ is assumed to be much greater than unity in the final or stable state, the phase shift $\theta_B$ for the final or stable state is expressed as follows:

$$\theta_B = \theta_{iB} - (E_R/K_d) \tag{25}$$

From equations (13) and (24), the detected output $E_{OB}$ from phase detector 21 can be expressed as follows:

$$E_{OB} = \frac{K_d\theta_{iB} + KK_d\mu_B F_B(S) E_R}{1 + KK_d\mu_B F_B(S)} \tag{26}$$

Because it is assumed that $KK_d\mu_B F_B(O)$ is much greater than unity and $KK_d\mu_B F_B(0)$ is much greater than $K_d\theta_{iB}$, in the final or stable state, phase detector output $E_{OB}$, in the final or stable state, can be expressed as follows:

$$E_{OB} = E_R \tag{27}$$

Further, control voltage $V_{CB}$ in the final or stable state can be derived from equations (22) and (25) and expressed as follows:

$$V_{CB} = (\theta_{iB}/K) - (E_R/KK_d) \tag{28}$$

In the embodiment of FIG. 10, normal phase lock loop-control can be obtained in the case where $E_R = 0$. By changing reference voltage $E_R$, control voltage $V_{CB}$ during the burst interval is also changed, so that the output phase $\theta_B$ is consequently altered. Thus, hue adjustment can be effected by varying reference voltage $E_R$.

In the closed-loop circuit 20", during portion $S_{VC}$ of the VIR signal interval $S_I$, the output phase $\theta_V$ can be expressed according to the following equation:

$$\theta_V = KV_{CB} + \frac{mKY_{iBV}\mu_V F_V(S)[K_d\theta_{iV} - KK_d V_{CB} - E_R]}{1 + KK_d m Y_{iBV}\mu_V F_V(S)} \tag{29}$$

In the final or stable state, $KK_d m Y_{iBV}\mu_V F_V(0)$ is much greater than unity, and the above equation (29) can be rewritten as follows:

$$\theta_V = \theta_{iV} - (E_R/K_D) \tag{30}$$

The output voltage $E_{OV}$ can be expressed by the following relation derived from equations (14) and (29):

$$E_{OV} = \frac{K_d\theta_{iV} + KK_d m Y_{iBV}\mu_V F_V(S) E_R}{1 + KK_d m Y_{iBV}\mu_V F_V(S)} \tag{31}$$

Again, in the flinal or stable state, $KK_d m Y_{iBV}\mu_V F_V(0)$ is much greater than unity, and $KK_d m Y_{iBV}\mu_V F_V(0)$ is much greater than $K_d\theta_{iV}$. Thus, output level $E_{OV}$ can be expressed:

$$E_{OV} = E_R \tag{32}$$

The final or stable state value of the control voltage $V_{CV}$ can be derived from equation (30) and (23), and expressed as follows:

$$V_{CV} = \theta_{iV}/K - E_R/KK_d \tag{33}$$

Also, the final or stable state value of amplified output level $Y_{OBV}$ can be expressed by the following equation derived from equations (20) and (33):

$$Y_{OBV} = (\theta_{iV}/K) - (E_R/KK_d) - V_{CB} \tag{34}$$

The final state phase difference $\Delta\theta_O = \theta_V - \theta_B$, which is the phase difference between the phase shift supplied by phase modulator 23 during portion $S_{VC}$ of the VIR signal $S_I$ and that supplied during the burst signal $S_B$, can be expressed by the following relationship derived from equations (25) and (30):

$$\Delta\theta_O = \theta_V - \theta_B = \theta_{iV} - \theta_{iB} = \Delta\theta_i \tag{35}$$

Thus, according to equation (35), the difference $\Delta\theta_O$ between the phase shift supplied by phase modulator 23 during portion $S_{VC}$ of the VIR signal $S_I$ and that supplied during the burst signal $S_B$, is equal to the phase difference $\Delta\theta_i$ correspondint to the differential phase distortion in the video signal. Accordingly, the output phase of the continuous wave signal $S_{SC}$ is controlled to compensate for the input phase distortion. As a result, if the continuous wave signal $S_{SC}$ is supplied with an output phase shift $\theta_O$ and the resulting signal is applied to a color demodulator as a chrominance subcarrier, the demodulated output from the demodulator will be free from phase distortion.

The amplified output level $Y_{OBV}$ can be expressed by the following relationship derived from equations (28) and (33):

$$Y_{OBV} = V_{CV} - V_{CB} = (\theta_{iV} - \theta_{iB})/K = \Delta\theta_i/K \tag{36}$$

Accordingly, the phase control signal $V_C$ is controlled so that amplified output level $Y_{OBV}$, which is just the difference in levels between the pedestal level and the VIR brightness level (70 IRE units), will take on a value equal to $\theta_i/K$. Finally, because the phase of the output of oscillator 22 is adjusted in phase modulator 23 according to the brightness level of the video signal, the hue correction is dynamically performed for all brightness levels in the same manner as in the hue correction circuits of 20,20' FIGS. 3 and 8.

The adjustment of hue for individual preference may not be required when automatic hue correction is performed in response to the VIR signal $S_I$. In that case, the hue correction circuit 20" of FIG. 10 may be designed without the comparator 60 and with the output of phase detector 21 being connected directly to sample and hold circuits 25a and 25b as though reference voltage $E_R$ was at the zero level.

Figure 11:
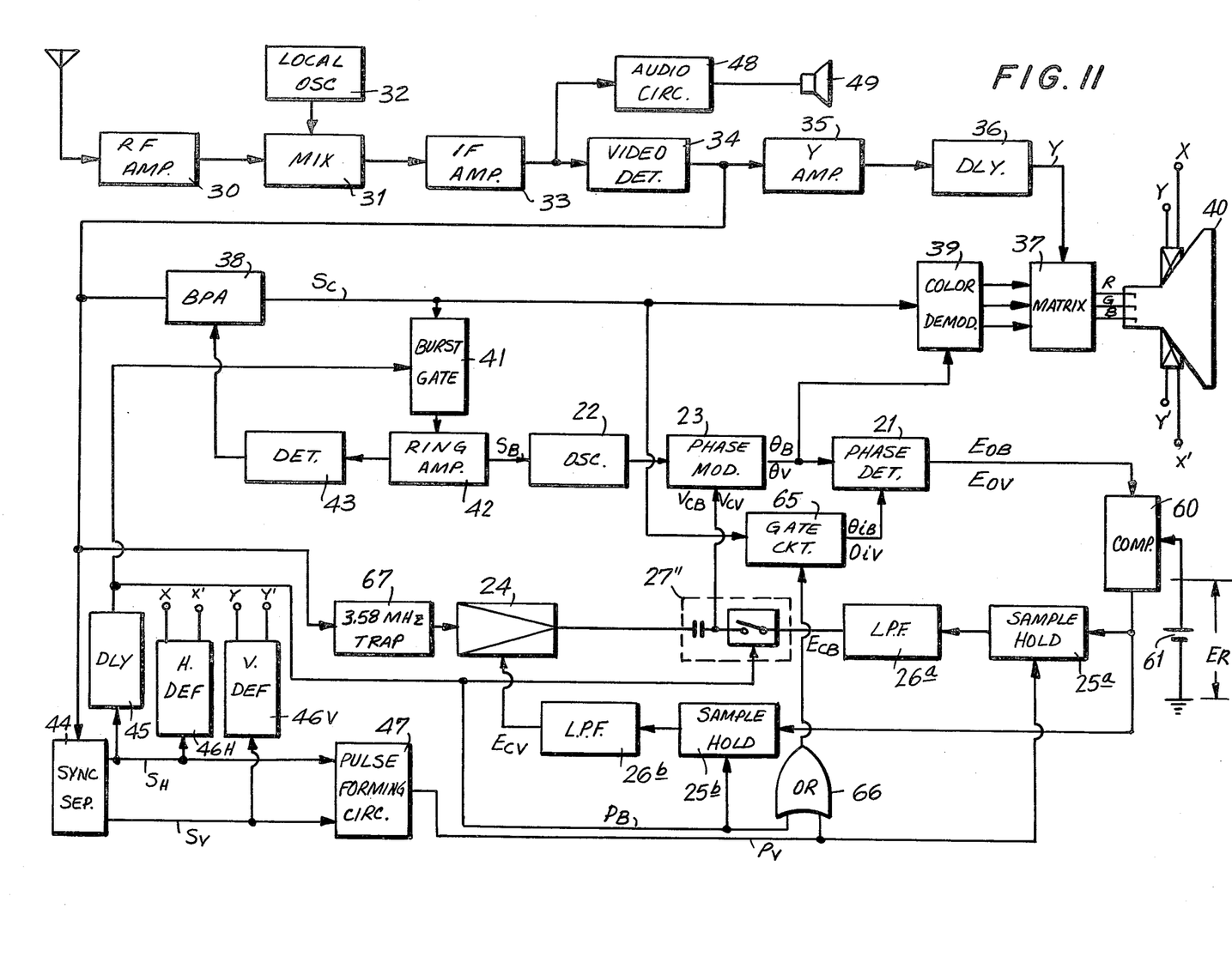
FIG. 11 is a system diagram of a television receiver incorporating the hue correction circuit of FIG. 10.

A television receiver incorporating the hue correction circuit 20" of FIG. 10 is shown on FIG. 11 to include many elements corresponding to those in the receiver shown in FIG. 6 and which are identified by the same reference numerals. The embodiment of FIG. 11 further includes a gate circuit 65 which applies chrominance signal $S_c$ to phase detector 21 during the burst signal $S_B$ and during portion $S_{VC}$ of the VIR signal. In order to achieve the foregoing, sampling pulse $P_V$ and clamping pulse $P_B$ are supplied to the gate 65 through an OR circuit 66. Further, the receiver incorporates a trap circuit 67 sensitive to a frequency of 3.58 MHz and being interposed between video detector 34 and amplifier 24 for ensuring only the luminance signal is applied to the latter.

Figure 12:
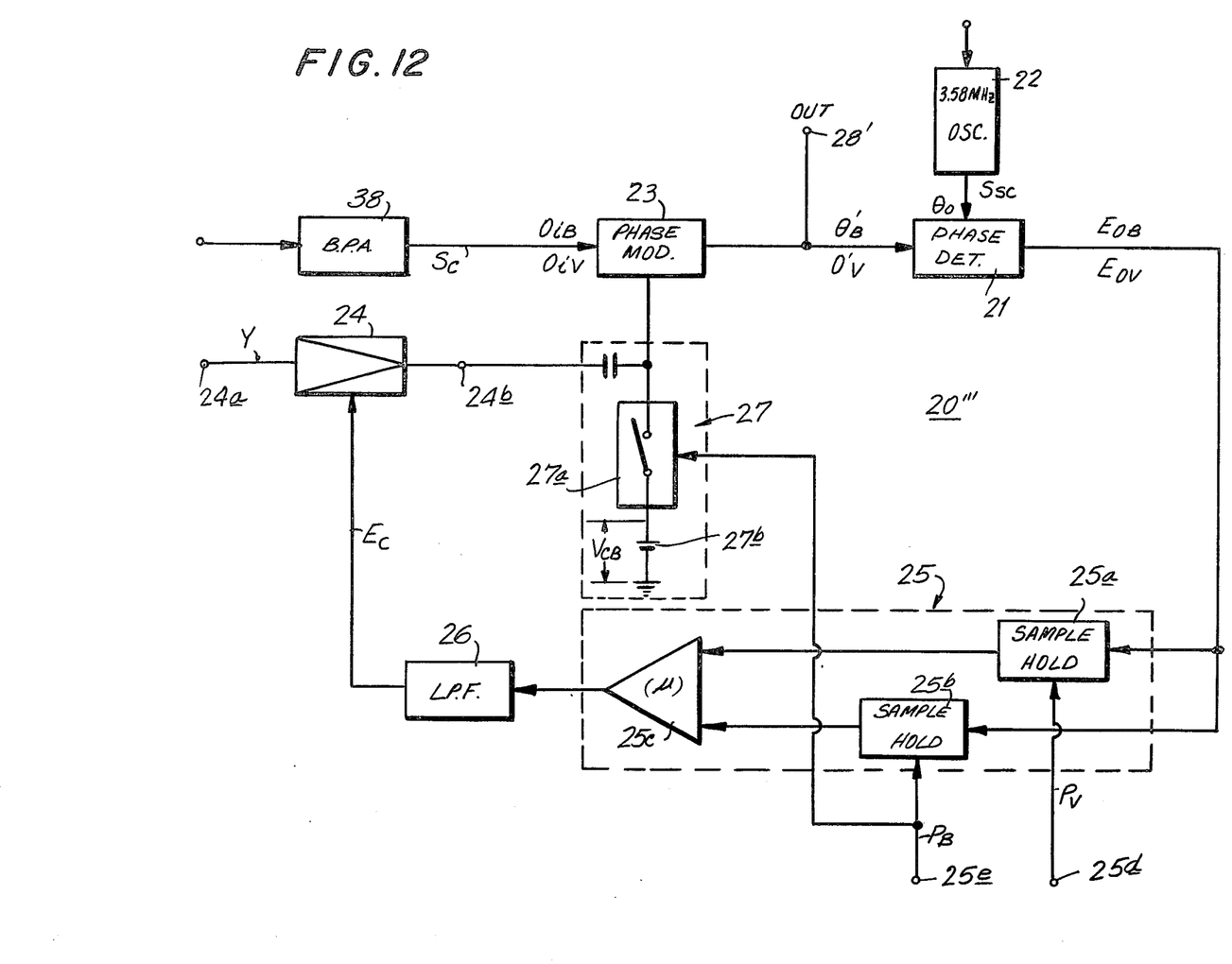
FIG. 12 is a system diagram showing a modification of a hue correction circuit according to the present invention.

In all of the above described embodiments, the phase of the continuous wave signal $S_{sc}$ as applied to the color demodulator 39 or 39' has been controlled to compensate for phase distortion. However, it is also possible to compensate for phase distortion by similarly controlling the phase of the chrominance signal $S_C$ as applied to demodulate 39 or 39' rather than controlling the phase of the continuous wave signal $S_{SC}$. Phase control of chrominance signal $S_C$ will also result in effective hue control. For example, as shown on FIG. 12, a hue correction circuit 20''' according to this invention may comprise a phase detector 21, an oscillator 22, a phase distortion detection circuit 25, a low-pass filter 26, a gain-controlled amplifier 24, and a clamping circuit 27, arranged in a manner similar to that of hue correction circuit 20 (FIG. 3). However, in circuit 20''', the continuous wave signal $S_{SC}$ from oscillator 22 is applied directly to the phase detector 21, and the chrominance signal $S_C$ derived from band pass amplifier 38 is applied to phase modulator 23, with the phase modulated output of the latter being supplied to phase detector 21. In effect, the phase difference between the chrominance signal $S_C$ and the continuous wave signal $S_{SC}$ is adjusted by phase modulating the chrominance signal $S_C$ rather than by phase modulating the continuous wave signal $S_{SC}$. In the hue correction circuit 20''', the continuous wave signal $S_{SC}$ has a constant phase when supplied to phase detector 21, so that the phase of the chrominance signal $S_C$ is modulated by phase modulator 23 according to the output of phase detector 21 during the burst signal $S_B$ and portion $S_{VC}$ of the VIR signal so that the output phases $\theta'_B$ and $\theta'_V$, respectively, of phase modulator 23 become equal to each other and to the phase of continuous wave signal $S_{SC}$. The phase modulated output obtained at terminal 28' of hue correction circuit 20''' can thus be applied to the chrominance signal input of the color demodulator to produce a demodulated output free from phase distortion.

Although several specific embodiments of the invention have been described in detail herein, with reference to the accompanying drawings, it is to be understood that the invention is not limited to those precise embodiments, and that various changes and modifications may be made by one skilled in the art without departing from the scope or spirit of the invention as defined in the appended claims.

What is claimed is:

1. In a color video display apparatus responsive to a composite color video signal which includes a luminance component and a chrominance component containing a chrominance signal, a burst signal and a chrominance reference portion of a vertical interval reverence (VIR) signal; a hue correction circuit comprising
reference oscillator means for providing a continuous wave signal;
comparator means for providing an output in dependence on a phase difference between said burst signal and said chrominance reference portion of the VIR signal, said comparator means including phase detecting means receiving said chrominance component and said continuous wave signal for detecting phase differences between said burst signal and said continuous wave signal, and between said chrominance reference portion of the VIR signal and said continuous wave signal, respectively, and means for comparing said phase differences detected by said phase detecting means during said burst signal and during said chrominance reference portion, respectively, for providing said output in correspondence to the comparison of said phase differences;
means for providing a correction signal varying with both said luminance component and said output of the comparator means; and
means for adjusting a phase difference between said chrominance signal and said continuous wave signal in dependence on said correction signal.

2. A color video display apparatus according to claim 1; in which said continuous wave signal from said reference oscillator means has the same frequency as said burst signal.

3. A color video display apparatus according to claim 2; in which said means for providing a correction signal includes a gain controlled amplifier acting on said luminance component and having its gain controlled by said output from said comparator means.

4. A color video display apparatus according to claim 2; further comprising color demodulating means receiving said chrominance component and said continuous wave signal for demodulating color outputs from said chrominance signal on the basis of said continuous wave signal; and in which said means for adjusting a phase difference between said chrominance signal and said continuous wave signal includes phase modulating means acting on said continuous wave signal between said reference oscillator means and said demodulator means in response to said correction signal.

5. A color video display apparatus according to claim 2; in which said phase detecting means includes color demodulating means receiving said chrominance component and said continuous wave signal for providing a plurality of demodulated color outputs therefrom, and one of said demodulated color outputs is applied to said means for comparing the phase differences during said burst signal and during said chrominance reference portion.

6. In an apparatus for displaying a color video picture in response to a composite color video signal which includes a luminance component and a chrominance component containing a chrominance signal, a burst signal and a chrominance reference portion of a vertical interval reference (VIR) signal; a hue correction circuit comprising
oscillator means for providing a continuous wave signal having the same frequency as the burst signal;
phase comparator means for comparing the phases of said burst signal and said chrominance reference portion of the VIR signal and providing an output in correspondence to any difference therebetween, said phase comparator means including phase detecting means receiving said chrominance component and said continuous wave signal for providing outputs corresponding to phase differences between said burst signal and said continuous wave signal and between said chrominance reference portion of the VIR signal and said continuous wave signal, respectively, and level detecting means for comparing the levels of said outputs from said phase detecting means during said burst signal and during said chrominance reference portion, respectively, and providing said output of the phase comparator means in dependence on a difference between said levels;
controlled amplifier means for providing a correction signal in response to both the luminance signal and the output of said phase comparator means; and
phase modulator means controlled by said correction signal for adjusting the phase difference between the chrominance signal and the continuous wave signal.

7. An apparatus according to claim 6; in which said phase detecting means includes a color demodulator, said color demodulator provides a plurality of demodulated color outputs, and one of said demodulated color outputs is supplied to said level detecting means as said outputs corresponding to phase differences.

8. An apparatus according to claim 7; in which said level detecting means includes
claimping means for clamping the output level of said phase detecting means to a predetermined level during the burst signal;
signal sampling means for sampling the signal level of said one demodulated color output during the chrominance reference portion of said VIR signal; and
a comparator circuit for comparing the sampled signal level with said predetermined level, and providing a corresponding output to said controlled amplifier means.

9. An apparatus according to claim 6; in which said level detecting means includes
first and second sampling means connected to said phase detecting means for sampling the output of the latter during the burst signal and the chrominance reference portion of the VIR signal, respectively.

10. An apparatus according to claim 9; in which said level detecting means further includes
a level comparator connected to said first and second sampling means for comparing the sampled levels therefrom, and providing an output in response to the compared sampled levels.

11. An apparatus according to claim 10; in which said level detecting means further includes
signal holding means for holding the output of said level comparator and providing a signal to control the gain of said controlled amplifier means.

12. An apparatus according to claim 9; in which said second sampling means is connected with said controlled amplifier means in order to control the gain of the latter; and said hue correction circuit further includes a clamp circuit interposed between said controlled amplifier means and said phase modulator means for clamping the correction signal of said controlled amplifier means to the sampled level of said first sampling means during the burst signal.

13. An apparatus according to claim 6; in which said hue correction circuit further comprises a clamp circuit interposed between said controlled amplifier means and said phase modulator means for clamping the output of said controlled amplifier means to a reference level during said burst signal.

14. An apparatus according to claim 6; in which said phase modulator means is connected with the output of said oscillator means for adjusting the phase of the continuous wave signal in response to said correction signal.

15. An apparatus according to claim 6; further comprising chrominance processing means for separating said chrominance signal from said composite color video signal, and said phase modulator means is connected with said chrominance processing means for adjusting the phase of the chrominance signal in response to said correction signal.

* * * * *